United States Patent
Wang et al.

(10) Patent No.: US 10,447,038 B2
(45) Date of Patent: Oct. 15, 2019

(54) MICROGRIDS WITH DYNAMICALLY CONFIGURABLE BOUNDARIES INCLUDING MULTIPLE MAIN GRID FEEDER COUPLING LOCATIONS AND METHODS OF OPERATING THE SAME

(71) Applicant: University of Tennessee Research Foundation, Knoxville, TN (US)

(72) Inventors: Fei Wang, Knoxville, TN (US); Xiaojie Shi, Knoxville, TN (US); Leon M. Tolbert, Knoxville, TN (US); Yiwei Ma, Knoxville, TN (US); Yilu Liu, Knoxville, TN (US); Lin Zhu, Knoxville, TN (US)

(73) Assignee: University of Tennessee Research, Knoxville, TN (US)

( * ) Notice: Subject to any disclaimer, the term of this patent is extended or adjusted under 35 U.S.C. 154(b) by 0 days.

(21) Appl. No.: 15/809,329

(22) Filed: Nov. 10, 2017

(65) Prior Publication Data
US 2019/0148941 A1    May 16, 2019

(51) Int. Cl.
H02J 3/38      (2006.01)
H02J 13/00    (2006.01)
H02J 3/14      (2006.01)
G05B 15/02   (2006.01)

(52) U.S. Cl.
CPC .............. *H02J 3/14* (2013.01); *G05B 15/02* (2013.01); *H02J 3/381* (2013.01); *H02J 13/0017* (2013.01)

(58) Field of Classification Search
CPC ....................................................... H02J 3/14
See application file for complete search history.

(56) References Cited

U.S. PATENT DOCUMENTS

2012/0175955 A1*  7/2012  Carralero .............. H02J 3/381
                                                                    307/38
2016/0285268 A1*  9/2016  Majumder .............. H02J 3/38
2018/0301903 A1* 10/2018  Majumder ............. H02J 3/006

OTHER PUBLICATIONS

G. Martin and S. Kolek, "Microgrid switch technology, " DOE microgrid workshop session 1, 2011, available online: http;//e2rg.com/microgrid/switch_breakout1.pdf.
E. Alegria, "Lessons learned and best practices: Santa Rita Jail microgrid project," 2012, available online: http://e2rg.com/microgrid-2012/Santa_Rita_Jail_Alegria.pdf.
G. Paoletti, J. R. Carron, L. Blankenstein, "Eaton's intelligent grid solutions," 2016, available online: http://c.ymcdn.com/sites/www.tahfm.org/resource/resmgr/Interlink_2016/paoletti_gabe_interlink2016.pdf.
A. K. Srivastava and T. Ryan, "The WSU microgrid", available online: https:l/building-microgrid.lbl.gov/sites/all/files/santiago srivastava.pdf.

(Continued)

Primary Examiner — Mark A Connolly
(74) Attorney, Agent, or Firm — Myers Bigel, P.A.

(57) ABSTRACT

An energy system includes a microgrid including a network of at least one distributed energy resource and a plurality of loads, the at least one distributed energy resource being configured to supply power to the plurality of loads. The microgrid is configurable to connect to one of a plurality of feeder circuits of a main power grid at one of a plurality of coupling interface locations, respectively. The microgrid is also configurable to expand or shrink its power supply area according to the available power generation capabilities.

26 Claims, 13 Drawing Sheets

(56) References Cited

OTHER PUBLICATIONS

Dolan Technology Center, "CERTS microgrid test bed," available online: http://certs.aeptechlab.com/.
ESTCP, Microgrid Enabled Distributed Energy Solutions (MEDES), Fort Bliss Military Reservation, Technical Report, Apr. 2014 (57 pages).
Paquette et al., "Design of the Fort Sill Microgrid", in *Proc. IEEE Energy Convers. Cong. Expo.*, 2014, pp. 4640-4646.
B. Sagoo, "A Holistic Microgrid Energy Management System for Improved Energy Efficiency and Renewable Integration," in *Microgrid Symposium*, Santiago, Chile, Sep. 2013 (30 pages).
Salcedo et al., "Development of a Real-Time Hardware-in-the-Loop Power Systems Simulation Platform to Evaluate Commercial Microgrid Controllers," Technical Report, Feb. 2016 (101 pages).
CERTS, "Integration of Dstributed Energy Resources: The CERTS Microgrid Concept," White Paper, Apr. 2002 (32 pages).

\* cited by examiner

MICROGRIDS WITH DYNAMICALLY CONFIGURABLE BOUNDARIES INCLUDING MULTIPLE MAIN GRID FEEDER COUPLING LOCATIONS AND METHODS OF OPERATING THE SAME

STATEMENT REGARDING FEDERALLY SPONSORED RESEARCH OR DEVELOPMENT

This invention was made with government support under contract number DE-AR0000665 awarded by the Advanced Research Projects Agency-Energy (ARPA-E) and contract number EEC-1041877 awarded by the National Science Foundation (NSF). The government has certain rights in the invention.

BACKGROUND

The present disclosure relates to power systems, and, in particular, to microgrid power systems.

A microgrid is an energy distribution network that typically includes one or more Distributed Energy Resources (DERs) and loads. A microgrid may operate in concert with a main power grid and may also operate independently of the main power grid in a mode known as islanded. The connection between a microgrid and the main power grid is typically at a single utility interface point, i.e., one Point-of-Common-Coupling (PCC). This single PCC provides an interface between the microgrid and a feeder of the main power grid. Although some configurations may provide multiple main power grid feeders for supplying power to a microgrid, these configurations are typically designed to connect the multiple main power grid feeders to a single Alternating Current (AC) power bus and this AC power bus serves as the interface to the microgrid at a single PCC. Thus, although multiple main power grid feeders may be available to provide service to a microgrid, the single PCC with the microgrid may reduce the effectiveness and/or the benefits of the redundancy provided through the multiple feeders. For example, although a microgrid typically only uses one main power grid feeder connection under normal operation conditions, when a fault occurs at the PCC or internal to the microgrid, then those loads between the fault and the PCC may be isolated from other potentially available main power grid feeders and may have to rely solely on one or more DERs within the microgrid. Without the ability to efficiently use the multiple main power grid feeders that may be available, a microgrid may need more DERs or DERs with higher power/energy capacities to supply energy and may have reduced reliability and increased costs in delivering power.

In addition, the network topology of a microgrid is generally fixed once it is configured. The static nature of the microgrid network topology, however, may result in inefficiencies, e.g., unnecessary load shedding or power curtailment, due to mismatches between load demands and power generated by the one or more DERs in the microgrid.

SUMMARY

In some embodiments of the inventive subject matter, an energy system comprises a microgrid comprising a network of at least one distributed energy resource and a plurality of loads, the at least one distributed energy resource being configured to supply power to the plurality of loads. The microgrid is configurable to connect to one of a plurality of feeder circuits of a main power grid at one of a plurality of coupling interface locations, respectively.

In other embodiments, the plurality of coupling interface locations comprises a plurality of alternating current bus circuits, respectively.

In still other embodiments, the microgrid is configured to change a topology of the network in response to an event.

In still other embodiments, the microgrid is further configured to increase a number of the plurality of loads in the network in response to the event.

In still other embodiments, the microgrid is further configured to decrease a number of the plurality of loads in the network in response to the event.

In still other embodiments, the microgrid is further configured to disconnect from a first one of the plurality of feeder circuits at a first one of the plurality of coupling interface locations and to connect to a second one of the plurality of feeder circuits at a second one of the plurality of coupling interface locations in response to the event.

In still other embodiments, the microgrid is further configured to disconnect from all of the plurality of feeder circuits of the main power grid in response to the event.

In still other embodiments, the event is a fault within the network and the microgrid is further configured to disconnect from a first one of the plurality of feeder circuits of the main power grid, to determine a power distribution between power supplied by the at least one distributed energy resource and power supplied via a second one of the plurality of feeder circuits of the main power grid, and to connect to a second one of the plurality of feeder circuits at a second one of the plurality of coupling interface locations in response to the event.

In still other embodiments, the microgrid is further configured to select the second one of the plurality of feeder circuits of the main power grid based on at least one of economic value, environmental impact, and reliability.

In still other embodiments, the event is a fault outside of the network and the microgrid is further configured to change a number of the plurality of loads in the network in response to the event.

In still other embodiments, the event comprises a determination of a cost of power provided by the main power grid through the plurality of feeder circuits and a determination of a cost of power provided by the at least one distributed energy resource.

In still other embodiments, the event comprises a power service interruption or a variation in power generated by the at least one distributed energy resource.

In still other embodiments, the at least one distributed energy resource comprises an energy storage system, a photovoltaic power generation system, a wind turbine power generation system, and/or a renewable resource power generation system.

In some embodiments of the inventive subject matter, a method comprises providing a microgrid comprising a network of at least one distributed energy resource and a plurality of loads, supplying power to the plurality of loads using the at least one distributed energy resource, and connecting the microgrid to one of a plurality of feeder circuits of a main power grid at one of a plurality of coupling interface locations, respectively, responsive to an event.

In further embodiments, the method further comprises changing a topology of the network in response to the event.

In still further embodiments, the method further comprises changing a number of the plurality of loads in the network in response to the event.

In still further embodiments, the method further comprises disconnecting from a first one of the plurality of feeder circuits at a first one of the plurality of coupling interface locations and connecting to a second one of the plurality of feeder circuits at a second one of the plurality of coupling interface locations in response to the event.

In still further embodiments, the method further comprises disconnecting from all of the plurality of feeder circuits of the main power grid in response to the event.

In still further embodiments, the event comprises a determination of a cost of power provided by the main power grid through the plurality of feeder circuits and a determination of a cost of power provided by the at least one distributed energy resource.

In still further embodiments, the event comprises a power service interruption or a variation in power generated by the at least one distributed energy resource.

In some embodiments of the inventive subject matter, a method comprises providing a microgrid comprising a network of at least one distributed energy resource and a plurality of loads supplying power to the plurality of loads using the at least one distributed energy resource, and dynamically changing a power supply area of the microgrid according to a power generation capability of the at least one distributed energy resource.

In other embodiments, dynamically changing the power supply area of the microgrid comprises changing a topology of the network in response to an event.

In still other embodiments, dynamically changing the power supply area of the microgrid comprises changing a number of the plurality of loads in the network in response to an event.

In still other embodiments, dynamically changing the power supply area of the microgrid comprises dynamically changing the power supply area of the microgrid responsive to an event. The event comprises a variation in power generated by the at least one distributed energy resource.

It is noted that aspects described with respect to one embodiment may be incorporated in different embodiments although not specifically described relative thereto. That is, all embodiments and/or features of any embodiments can be combined in any way and/or combination. Moreover, other methods, systems, articles of manufacture, and/or computer program products according to embodiments of the inventive subject matter will be or become apparent to one with skill in the art upon review of the following drawings and detailed description. It is intended that all such additional systems, methods, articles of manufacture, and/or computer program products be included within this description, be within the scope of the present inventive subject matter, and be protected by the accompanying claims. It is further intended that all embodiments disclosed herein can be implemented separately or combined in any way and/or combination.

BRIEF DESCRIPTION OF THE DRAWINGS

Other features of embodiments will be more readily understood from the following detailed description of specific embodiments thereof when read in conjunction with the accompanying drawings, in which.

DETAILED DESCRIPTION

Figure 1:
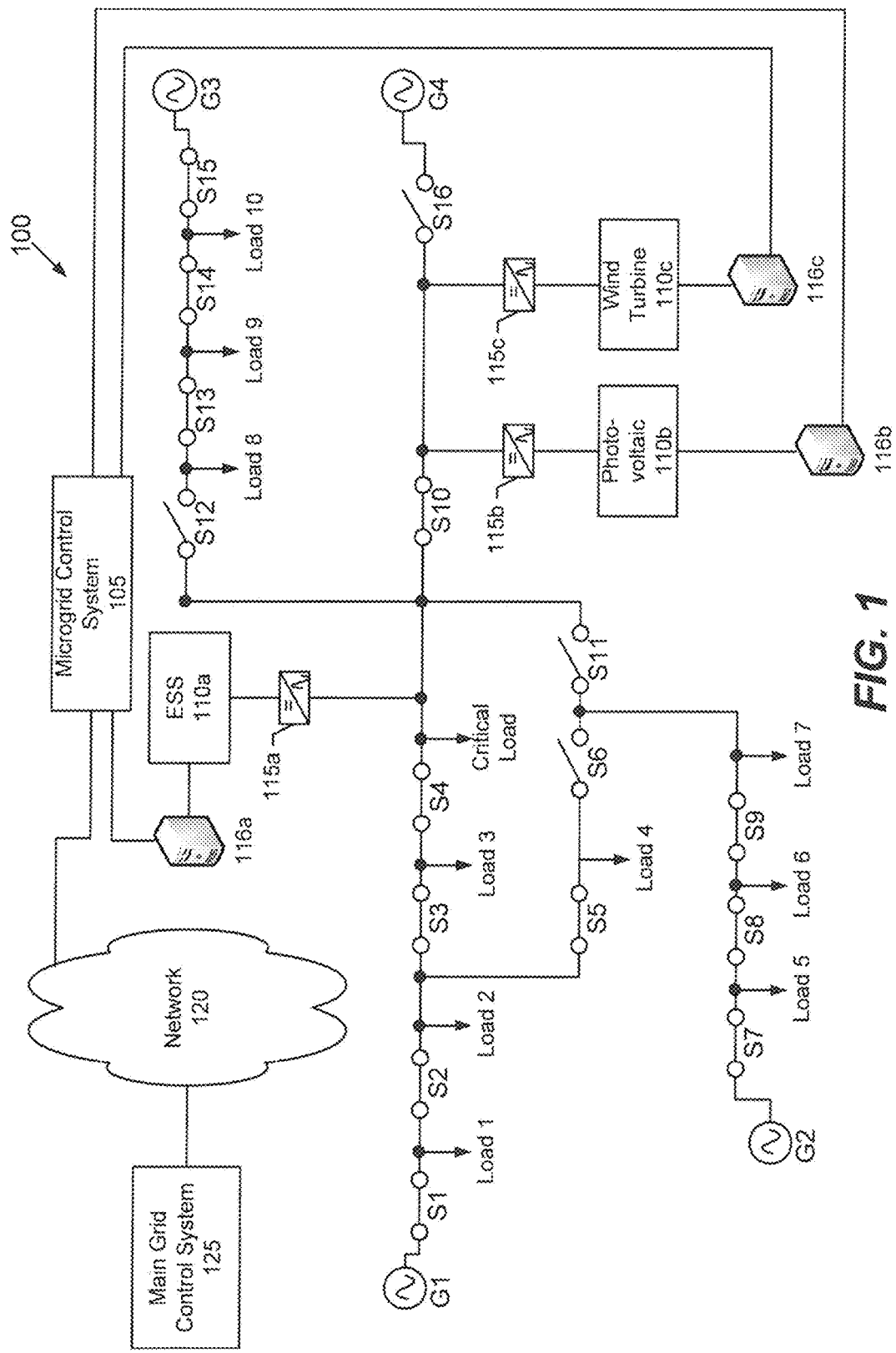
FIG. 1 is a block diagram that illustrates a power distribution network including a microgrid with dynamically configurable boundaries having multiple main power grid feeder coupling locations in accordance with some embodiments of the inventive subject matter.

In the following detailed description, numerous specific details are set forth to provide a thorough understanding of embodiments of the present disclosure. However, it will be understood by those skilled in the art that the present invention may be practiced without these specific details. In some instances, well-known methods, procedures, components and circuits have not been described in detail so as not to obscure the present disclosure. It is intended that all embodiments disclosed herein can be implemented separately or combined in any way and/or combination. Aspects described with respect to one embodiment may be incorporated in different embodiments although not specifically described relative thereto. That is, all embodiments and/or features of any embodiments can be combined in any way and/or combination.

As used herein, the term "data processing facility" includes, but it is not limited to, a hardware element, firmware component, and/or software component. A data processing system may be configured with one or more data processing facilities.

As used herein, the term "load" refers to any system, device, apparatus, or the like that consumes power.

As used herein a microgrid is an energy or power distribution network that may include one or more distributed energy resources and loads that are capable of operating in concert with or independently of a main power grid.

As used herein a distributed energy resource (DER) is a decentralized power generation source that typically outputs less power than the centralized power stations used in the main power grid to distribute power over large distances, such as coal-fired, gas, and nuclear powered plants. A DER system typically has a capacity of 10 MW or less and is located relatively close to the loads that it serves. A DER system may be part of a microgrid and may be used to provide power to the microgrid loads when the microgrid is connected to the main power grid and also at times when the microgrid is disconnected from the main power grid and operating in islanded mode. DER systems typically use renewable energy resources to generate power including, but not limited to, wind, photovoltaic (solar), biomass, biogas, geothermal, and/or hydroelectric. An electricity storage system (ESS), which can be used to store excess power that is generated during times of low demand, for example, may also be classified as a DER system.

Some embodiments of the inventive subject matter stem from a realization that a new operation paradigm can be applied to microgrid in which the previous constraints of a fixed boundary or footprint along with a single Point-of-Common-Coupling (PCC) to the main power grid are removed. According to some embodiments of the inventive subject matter, a microgrid may be configured with multiple options for connecting to feeder circuits of a main power grid. For example, a microgrid may have a plurality of coupling interface locations that respectively correspond to a plurality of feeder circuits of a main power grid. Thus, when a fault occurs that prevents the microgrid from connecting to one of the plurality of feeder circuits, the microgrid may disconnect from the feeder circuit affected by the fault and reconnect to another one of the feeder circuits at another coupling interface location on the microgrid to restore service from the main power grid. The microgrid may also include a microgrid control system and one or more DER control systems that cooperate to manage the operation of the microgrid including selecting new main grid power circuits to connect to, managing power distribution and coordination between DERs in the microgrid and power supplied by the main power grid, managing voltage level and frequency stability based on DER power generation and load demand during microgrid islanded mode operation, and the like. The microgrid control system and/or DER control system(s) may also cooperate with a main power grid control system to operate smart switches in the power distribution network to change the topology of the network. For example, due to relatively low power demand, the DERs in a microgrid may be generating more power than is used by loads in the microgrid. The microgrid control system and/or DER control system(s) may cooperate with a main power grid control system to change the network topology of the microgrid to increase the number of loads serviced by the microgrid. Similarly, when the power demand of loads in the microgrid exceeds the capabilities of the DERs that service the microgrid, the microgrid control system and/or DER control system(s) may cooperate with a main power grid control system to change the topology of the microgrid to decrease the number of loads serviced by the microgrid so as to move certain loads outside of the microgrid to be serviced solely by the main power grid. Similar changes in the microgrid network technology may be made in response to other events, including but not limited to, faults in power distribution infrastructure in the main power grid and/or microgrid, economics, e.g., relative cost of power generated by the main power grid versus power generated by DER(s), and the like.

Referring to FIG. 1, a power distribution network 100 including a microgrid with dynamically configurable boundaries having multiple main power grid feeder coupling locations, in accordance with some embodiments of the inventive subject matter, comprises a main power grid, which is typically operated by a public or private utility, which provides power to various power consumers. Electrical power generators in the main power grid are typically located near a fuel source, at a dam site, and/or at a site often remote from heavily populated areas. The power generators may be nuclear reactors, coal burning plants, hydroelectric plants, and/or other suitable facility for generating bulk electrical power. The power output from the power generators is carried via a transmission grid or transmission network over potentially long distances at relatively high voltage levels. A distribution grid may comprise multiple substations, which receive the power from the transmission grid and step the power down to a lower voltage level for further distribution. A feeder network distributes the power from the distribution grid substations to the power consumers. The power substations in the distribution grid may step down the voltage level when providing the power to the power consumers through the feeder network.

The power distribution network 100 further comprises a main grid control system 125, which may be referred to as a Distribution Management System (DMS) 125, which may monitor and control the generation and distribution of power via the main power grid. The DMS may comprise a collection of processors and/or servers operating in various portions of the main power grid to enable operating personnel to monitor and control the main power grid. The DMS may further include other monitoring and/or management systems for use in supervising the main power grid. One such system is known as the Supervisory Control and Data Acquisition (SCADA) system, which is control system architecture that uses computers, networked data communications, and graphical user interfaces for high-level process supervisory management of the main power grid.

According to some embodiments of the inventive subject matter, a microgrid may be dynamically configured amongst a plurality of loads and DERs in the power distribution network 100. As shown in FIG. 1, the power distribution network 100 includes eleven loads—Load 1-Load 10 and a Critical Load—that are connected to one or more feeder circuits of the main power grid G1, G2, G3, and G4 via sixteen smart switches S1-S16. The microgrid further includes three DERs: ESS 110a, photovoltaic power generation system 110b, and wind turbine power generation system 110c. Although, three DERs are shown in FIG. 1, it will be understood that fewer, more, and/or different types of DERs may be used in accordance with various embodiments of the inventive subject matter. The DERs 110a, 110b, and 110c are connected to the power distribution network 100 via power converters 115a, 115b, and 115c, respectively. Each of the DERs 110a, 110b, and 110c may also have a DER control system 116a, 116b, and 116c associated therewith. The DER control systems 116a, 116b, and 116c along with the power converters 115a, 115b, and 115c may be configured to provide the processing capability to carry out various functions for managing different DER assets in the power distribution network 100 including, but not limited to, load sharing, power generation in the microgrid during grid-connected mode, voltage and frequency regulation during islanded mode, harmonics and unbalanced voltage mitigation at the PCC with the feeder circuits of the main power grid, islanded detection, and the like. It will be understood that the foregoing functions may be provided by various combinations of the DER control systems 116a, 116b, and 116c and the power converters 115a, 115b, and 115c according to different embodiments of the inventive subject matter including embodiments in which all of the functions are provided via the power converters 115a, 115b, and 115c thereby eliminating a need for the DER control systems 116a, 116b, and 116c.

The microgrid control system 105 may be configured to serve as an interface between the main grid control system 125 and the DER control systems 116a, 116b, and 116c along with the power converters 115a, 115b, and 115c in the microgrid. The microgrid control system 105 may be configured to facilitate synchronization between the microgrid and the main power grid and to restore frequency and voltage when the microgrid operates in islanded mode. The microgrid control system 105 may be further configured to manage power generation among the DERs 110a, 110b, and 110c based on, for example, market prices for electricity/power, DER power generation capability, load conditions, and the like. Various parameters in the microgrid may be measured and sent to the microgrid control system 105 over a secure communication network with an acceptable bandwidth including, but not limited to, current, voltage, active and reactive power. These parameters may be measured and provided, for example, with respect to boundary conditions at the microgrid coupling interface locations with the various feeder circuits of the main power grid G1, G2, 03, and G4 and used to determine when to disconnect from a first feeder circuit and select a second feeder circuit with which to reconnect. The microgrid control system 105 may also communicate with the main grid control system 125 to manage the configuration of smart switches S1-S16 to dynamically reconfigure the network topology of the microgrid in response to various types of events. In accordance with various embodiments of the inventive subject matter, the microgrid control system 105 and/or the main grid control system 125 may set the state (i.e., open or closed) of the various smart switches S1-S16 in the power distribution network 100.

The microgrid control system 105 may communicate with the main power grid control system 125 over the network 120. The network 120 may be a global network, such as the Internet or other publicly accessible network. Various elements of the network 120 may be interconnected by a wide area network, a local area network, an Intranet, and/or other private network, which may not be accessible by the general public. Thus, the communication network 120 may represent a combination of public and private networks or a virtual private network (VPN). The network 120 may be a wireless network, a wireline network, or may be a combination of both wireless and wireline networks.

As shown in FIG. 1, feeder circuit G1 of the main power grid serves as the main utility feeder for a dynamically configurable microgrid that can be formed from the power distribution network 100. Before a microgrid is formed under the supervision of the microgrid control system 105, the main grid control system 125 may monitor the status of the main power grid feeder circuits G1-G4 and the states of the smart switches S1-S16. The DER control systems 116a, 116b, and 116c may monitor the active/reactive power and/or AC voltage references associated with the DERs 110a, 110b, and 110c and may send this information to the power converters 115a, 115b, and 115c over a local communication network. Other electrical parameters are also measured, including terminal voltage and current, power flow, power converter 115a, 115b, 115c operating status, and the like, and sent from the DER control systems 116a, 116b, and 116c to the microgrid control system 105. The main grid control system 125 may poll the microgrid control system 105 periodically to collect the electrical parameter measurement data. The microgrid control system 105 may poll the main grid control system 125 to obtain status information for the main power grid feeder circuits G1-G4 and state information for the smart switches S1-S16 for use in dynamically configuring the topology of the microgrid network. Based on the electrical characteristics of the power distribution network 100 along with other factors, such as economic value, environmental impact, reliability, and the like, the microgrid control system 105 may determine desired output power levels for the DERs 110a, 110b, and 110c along with the switching commands for the smart switches S1-S16 to dynamically configure the microgrid network topology in response to one or more events. In contrast with conventional microgrids, a microgrid formed from the power distribution network 100 of FIG. 1 has a plurality of coupling interface locations for connecting to feeder circuits G1-G4, respectively, of the main power grid. Each of these coupling interface locations comprises an AC bus circuit for receiving an independent source of power from the main power grid. Smart switches S1-S16 may respond not solely to faults detected in the power distribution network 100, but also to OPEN/CLOSE commands generated by the microgrid control system 105 and/or the main grid control system 125. When the microgrid disconnects from a first one of the plurality of feeder circuits, e.g., G1 in FIG. 1, the microgrid control system 105 may consider factors, such as, but not limited to, the ownership, priority, loading conditions, distance from health feeder circuits, economic value, environmental impact, reliability, and the like to select another feeder circuit, e.g., G2-G4, with which to form a new connection. In making the selection of a new feeder circuit with which to form a new connection, voltage and power balance within the microgrid may be considered constraints and economic value (e.g., electricity market pricing, power generation and operational costs, export power opportunities, and ancillary services), environmental impact/sustainability (e.g., emissions, carbon footprint, and efficiency), and reliability or energy surety (e.g., uninterrupted service probability) may be factors or objectives to optimize.

Figure 2:
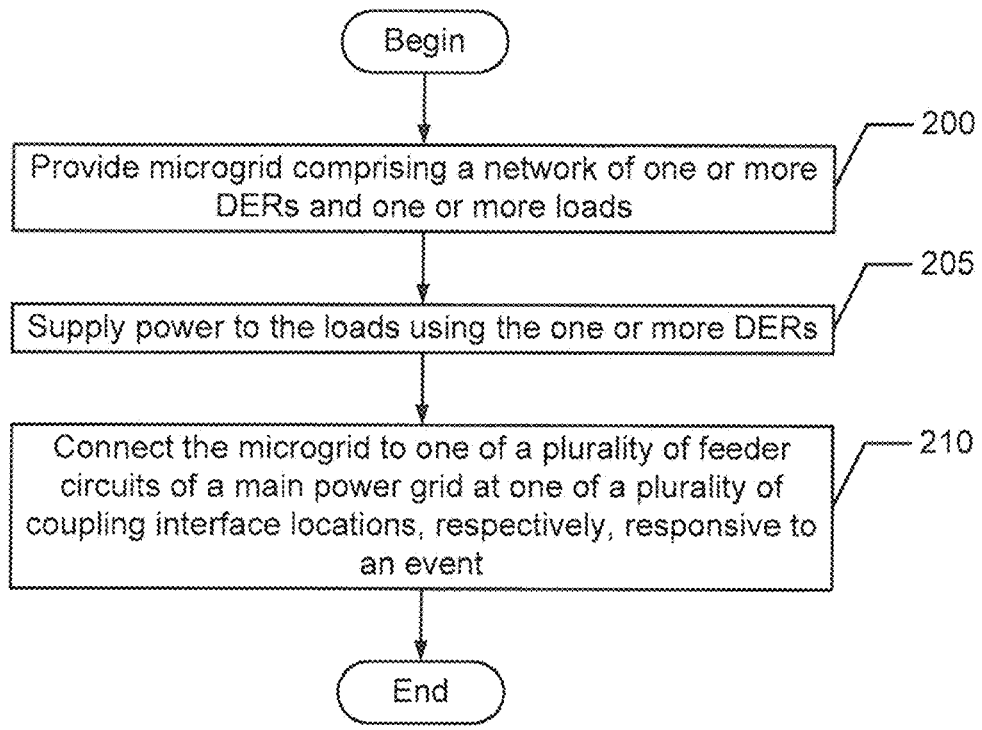
FIGS. 2-4 are flowcharts that illustrate operations of a power distribution network including a microgrid with dynamically configurable boundaries having multiple main power grid feeder coupling locations in accordance with some embodiments of the inventive subject matter.
Figure 3:
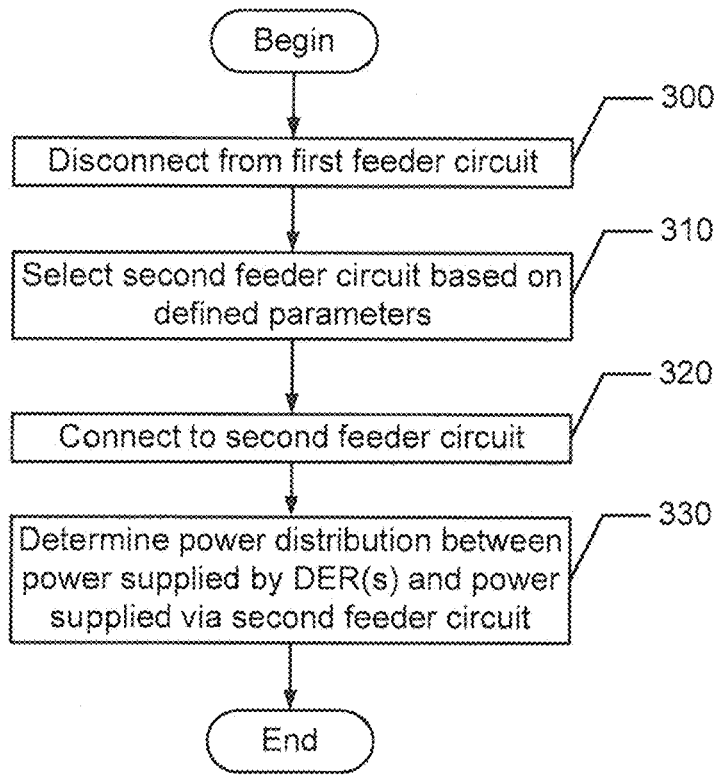
Figure 4:
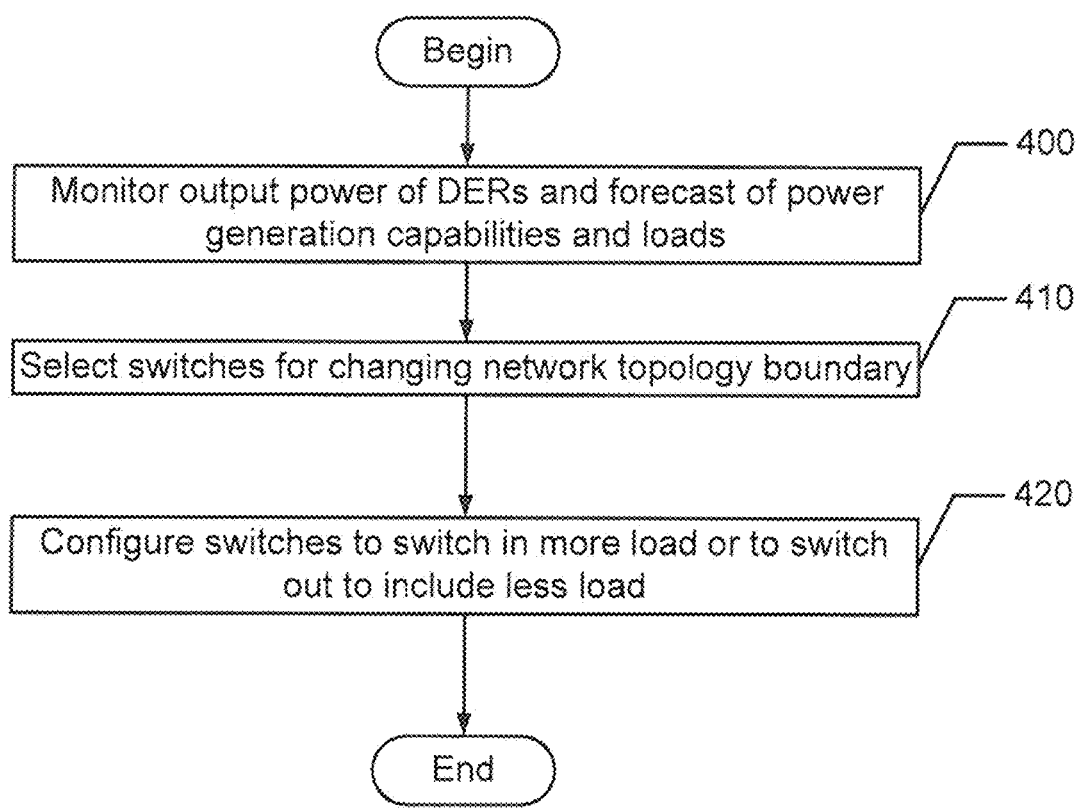

FIGS. 2-4 are flowcharts that illustrate operations of a power distribution network including a microgrid with dynamically configurable boundaries having multiple main power grid feeder coupling locations in accordance with some embodiments of the inventive subject matter. Referring now to FIG. 2, operations begin at block 200 where a microgrid is provided that comprises a network of one or more DERs and one or more loads. Power is supplied to the loads at block 205 using the one or more DERs. The microgrid is connected to one of a plurality of feeder circuits of a main power grid at one of a plurality of coupling interface locations, respectively, responsive to an event at block 210. According to embodiments of the inventive subject matter, the microgrid is configured to change a topology of the network of DERs and loads responsive to an event. The event may be an economic determination, such as, for example, a determination of the relative cost of power between that provided by the main power grid and that provided by one or more of the DERs in the microgrid. The event may also comprise an electrical fault, such as a power service interruption in a power generator, power grid distribution network, or the like.

Referring now to FIG. 3, the microgrid may be reconfigured by switching connections from one feeder circuit of the main power grid to another feeder circuit of the main power grid. Operations begin at block 300 where the microgrid disconnects from a first feeder circuit. A second feeder circuit is selected based on defined parameters at block 310, such as, but not limited to, economic value, environmental impact, and reliability, as described above. The microgrid is connected to the second feeder circuit at block 320. A determination may be made regarding how to distribute power supplied by one or more of the DER(s) and the power from the main power grid supplied via the second feeder circuit at block 330.

Referring now to FIG. 4, the topology of the microgrid in islanded mode operation can be changed dynamically based on the available power output of the one or more DERs. Operations start at block 400 where the operating status, such as output power of the DERs, and forecasting results of the power generations and loads are monitored. Based on the collected information, available switches for the network topology boundary change are evaluated and selected at block 410. The selected switch(es) are then switched in to include more load or switched out to include less load at block 420.

When the microgrid is connected to the main power grid, the DERs, such as the photovoltaic power generation system 110b and the wind turbine power generation system 110c, may operate at peak output mode to capture the maximum available energy. An ESS, such as ESS 110a, may be used to conduct market activities, such as peak shaving, load shifting, demand response, and the like for economic benefits. Voltage and frequency regulation functionality may be provided by the DER control systems 116a, 116b, and 116c and/or the power converters 115a, 115b, and 115c associated with the DERs 110a, 110b, 110c.

When the microgrid is disconnected from the main power grid and operates in islanded mode, the DER control system 116a associated with the ESS 110a may be responsible for AC bus voltage regulation and active/reactive power balance within the microgrid. This enables the continuous operation of the photovoltaic power generation system 110b and the wind turbine power generation system 110c to avoid any interruption in power supplied to the loads. In a conventional microgrid, if the power generated by the photovoltaic power generation system 110b and the wind turbine power generation system 110c exceeds the demand used by the loads and the storage capability of the ESS 110a, then power output from the photovoltaic power generation system 110b and the wind turbine power generation system 110c is reduced. According to some embodiments of the inventive subject matter, such an event may allow the microgrid to change the topology of its network of loads and DERs to increase the number of loads being serviced so that the amount of power output from the photovoltaic power generation system 110b and the wind turbine power generation system 110c need not be reduced or a lesser reduction may be applied. Likewise, if the power output from the ESS 110a, the photovoltaic power generation system 110b and the wind turbine power generation system 110c is insufficient to meet the demands of the supported loads, then the microgrid may decrease a number of supported loads by changing the topology of the microgrid network in a more flexible manner with a greater likelihood that critical loads may still be serviced.

When the microgrid exits islanded mode to reconnect to a new feeder circuit of the main power grid, a conventional microgrid typically can only reconnect to the main power grid when the fault or other causes of islanded is cleared, which may take a long time and result in significant service interruption to the loads being serviced by the microgrid. According to some embodiments of the inventive subject matter, a microgrid can reconnect to any healthy feeder circuit of the main power grid for which it has a coupling interface location even while the connection to the previous feeder circuit is still under maintenance. This process can be realized using a make-before-break technique and/or an active resynchronization control scheme provided by the ESS 110a. The active resynchronization control scheme may provide shorter reconnection times and result in less inrush current during reconnection.

Figure 5:
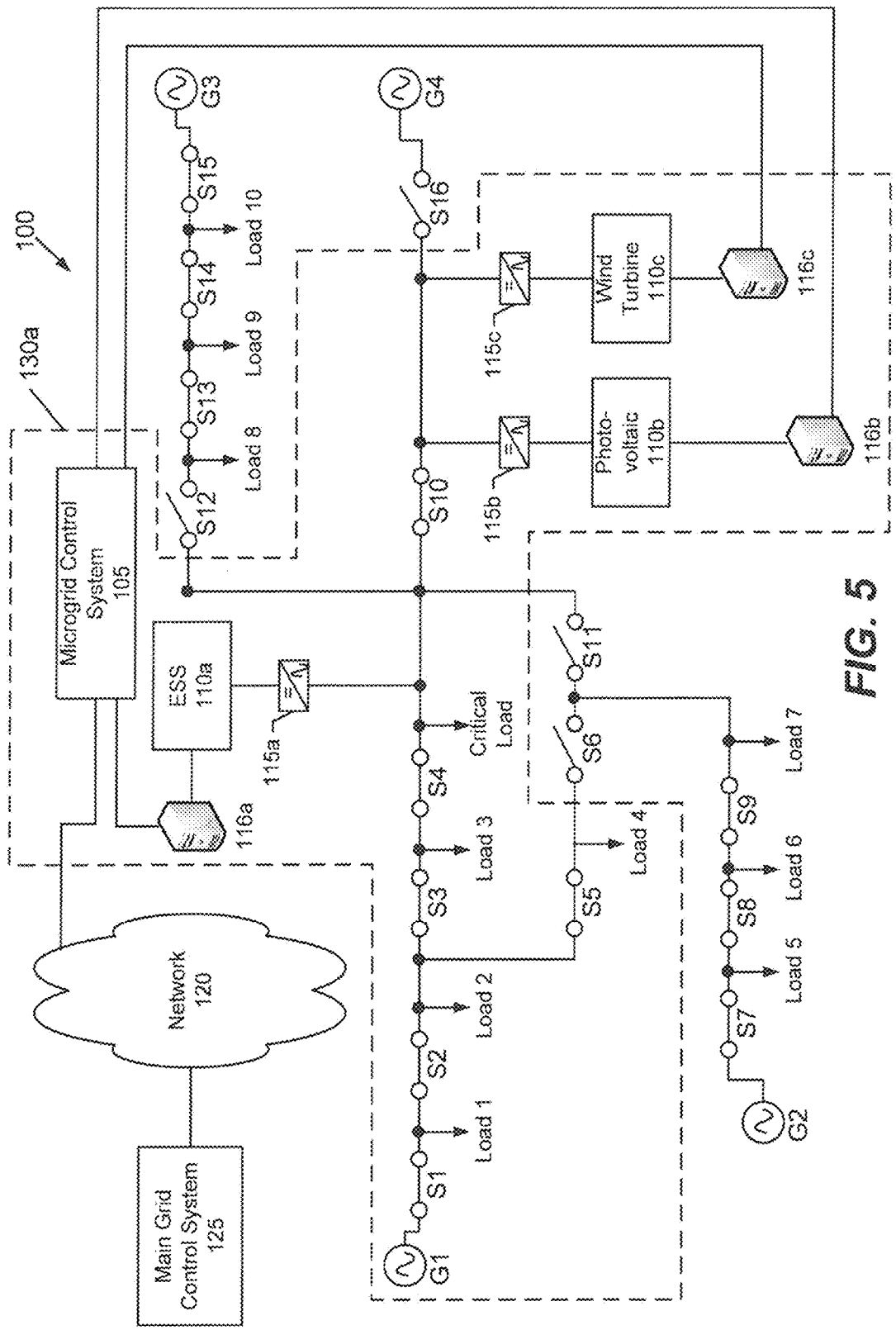
FIGS. 5-12 are block diagrams that illustrate various microgrid configurations in the power distribution network of FIG. 1 in accordance with some embodiments of the inventive subject matter.

FIGS. 5-12 are block diagrams that illustrate various microgrid configurations in the power distribution network of FIG. 1 in accordance with some embodiments of the inventive subject matter. Referring to FIG. 5, a microgrid 130a is formed in the power distribution network 100 through the opening of smart switches S6, S11, S12, and S16 so as to be connected to feeder circuit G1. Backup feeder circuits G2-G4 service their own loads outside of the microgrid 130a. The main power grid supplies the difference in power between the demand of Loads 1-4 and the Critical Load and the power output from DERs 110b, 110c, and sometimes the ESS 110a.

Figure 6:
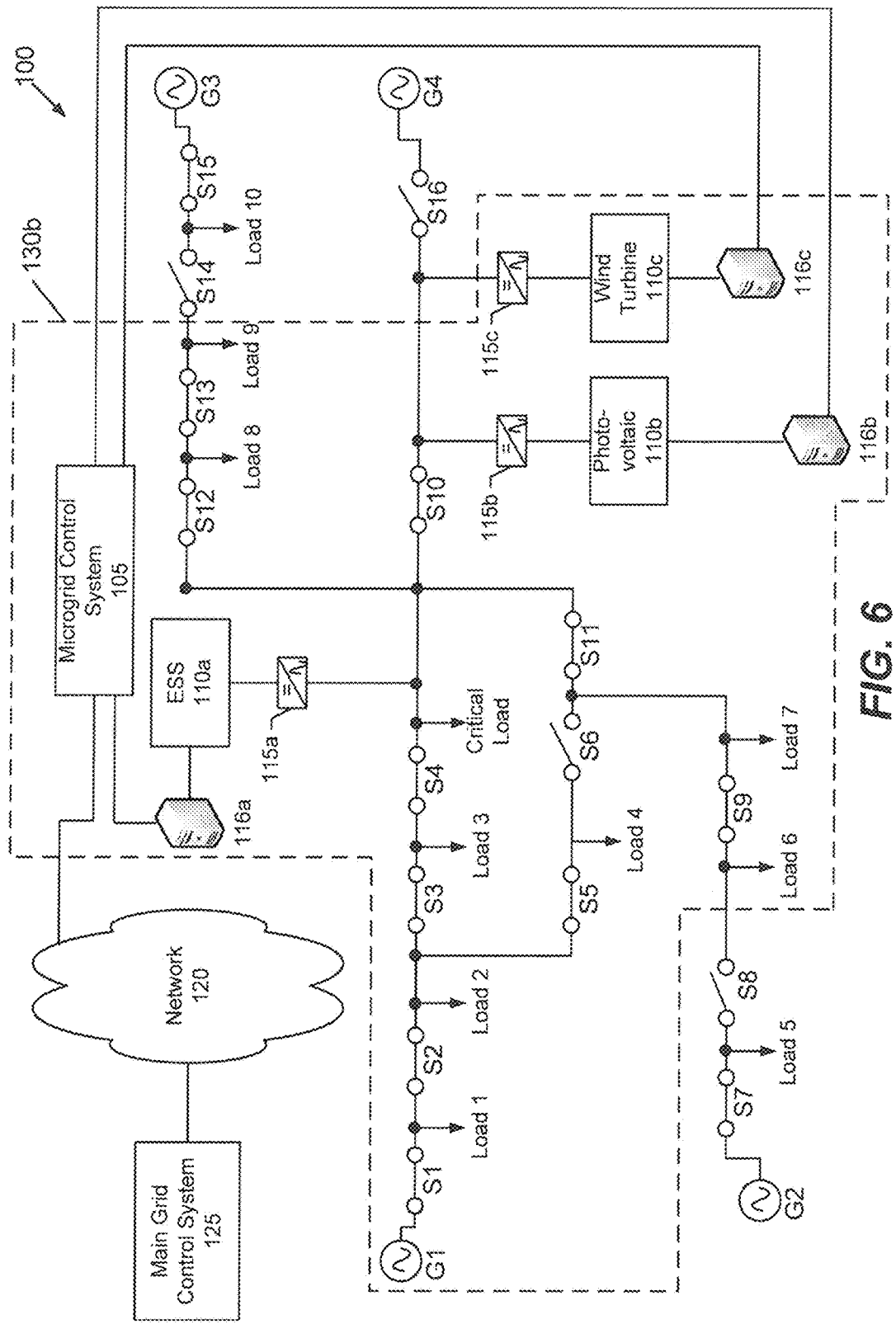

Referring to FIG. 6, when renewable power has a cost advantage over electricity sourced from the centralized power generation systems of the main power grid and excessive renewable power is available via the DERs 110b and 110c, then a microgrid 130b may be formed in response to such an event by closing smart switches S1 and S12 while opening smart switches S8 and S14 to bring in additional loads—Load 6, Load 7, Load 8, and Load 9—to be serviced by DERs 110a, 110 b, and 110c instead of via the main power grid through feeder circuits G2 and G3. Thus, the microgrid 130a may be reconfigured into the topology of microgrid 130b to increase the number of loads in the microgrid topology in response to the economic event of renewable energy enjoying a price advantage over that provided by the main power grid.

Figure 7:
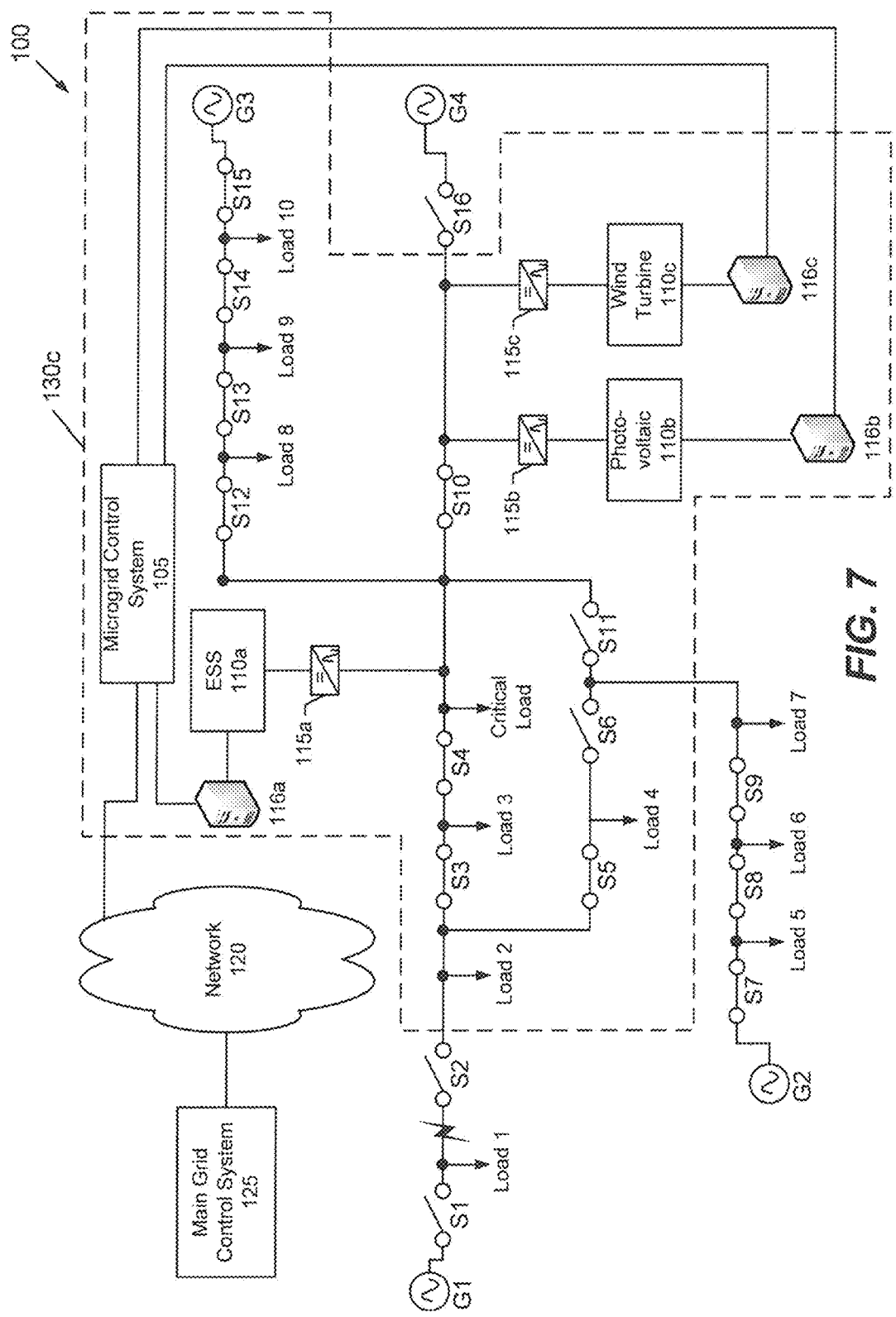
Figure 8:
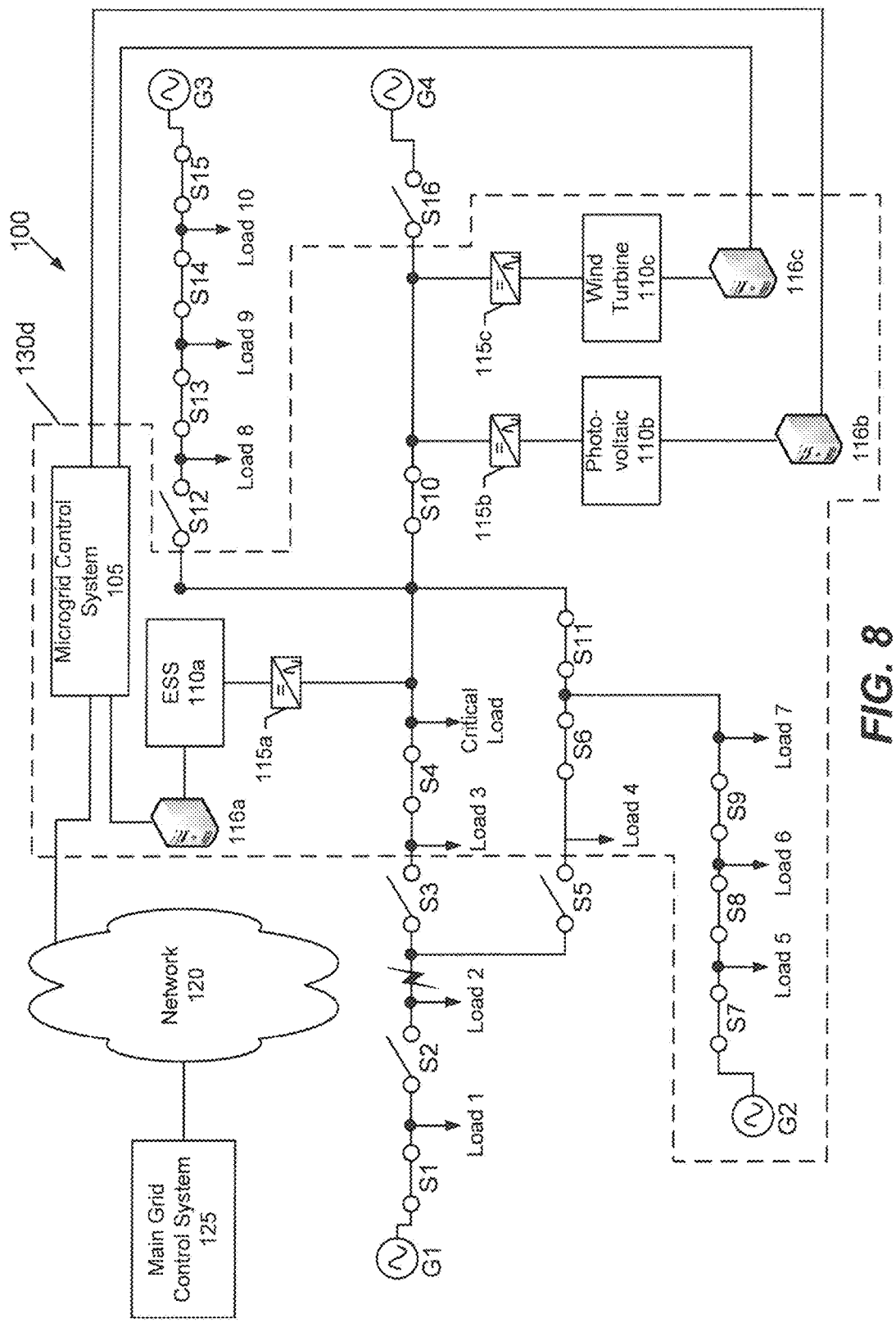
Figure 9:
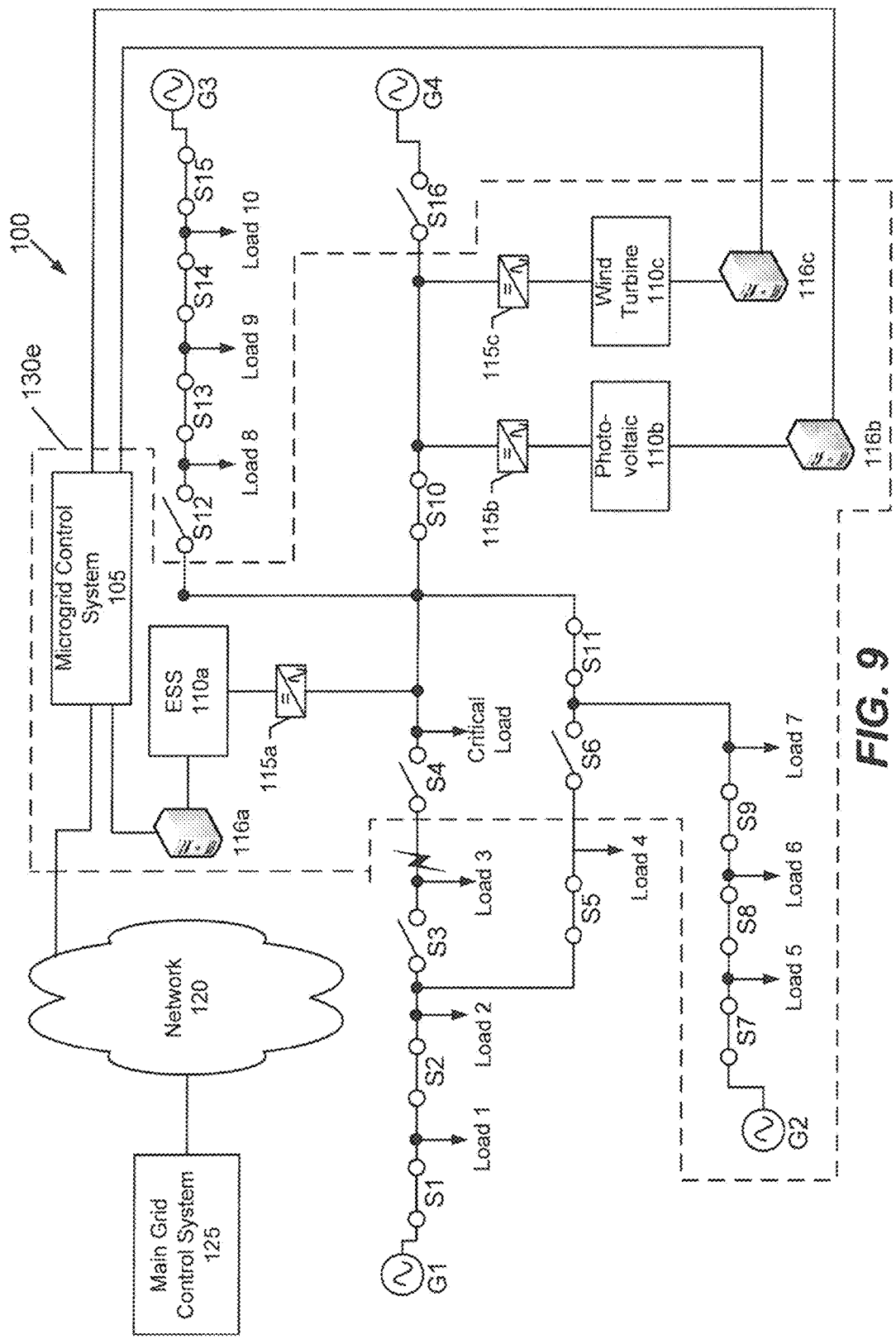

FIGS. 7-9 provide examples of dynamic microgrid network topology changes in response to faults in different parts of the power distribution network 100 according to some embodiments of the inventive subject matter. FIG. 7 illustrates an example in which a fault is detected between Load 1 and smart switch S2, which results in the microgrid 130c in which the microgrid 130a disconnects from feeder circuit G1 and reconnects to feeder circuit G3 through the opening of smart switches S1 and S2 to isolate the fault and the closing of smart switches S12-S15. FIG. 8 illustrates an example in which a fault is detected between Load 2 and smart switches S3 and S5, which results in the microgrid 130d in which the microgrid 130a disconnects from feeder circuit G and reconnects to feeder circuit G2 through the opening of smart switches S2, S3, and S5 to isolate the fault and the closing of smart switches S6 and S11. FIG. 9 illustrates an example in which a fault is detected between Load 3 and smart switch 84, which results in the microgrid 130e in which the microgrid 130a disconnects from feeder circuit G1 and reconnects to feeder circuit G2 through the opening of smart switches S3, S4, and S6 to isolate the fault and the closing of smart switch S11. Load 4 in this example is dropped from the microgrid 130e and picked up by the main power grid via the feeder circuit G1.

FIGS. 7-9 are examples in which a microgrid changes topology by disconnecting from one feeder circuit of the main power grid and reconnecting to a different feeder circuit of the main power grid. Three operations may be involved in accordance with some embodiments of the inventive subject matter: The fault is detected and isolated as described above. The microgrid enters islanded mode where the ESS 110a may regulate the AC voltage and frequency and balance power generation among the other DERs 110b, 110c and loads. The microgrid control system 105 may select a new feeder circuit (G3 in FIG. 7 and G2 in FIGS. 8 and 9) for reconnection to the main power grid by considering factors, such as, but not limited to, economic value, environmental impact, and reliability, of the resulting microgrid configuration, and the ESS 110a may track the voltage of the selected feeder circuit G1-G4 through resynchronization control. In the example of FIG. 7, the connection to feeder circuit G3 may be established by closing smart switch S12 when the magnitude, frequency, and angle differences between both side voltages of smart switch S12 stabilize into a desired range. If the voltage difference between the faulted feeder circuit (G1) and the selected feeder circuit (G3 of FIG. 7) is close enough initially, the microgrid 130a may connect to the selected feeder circuit G3 first before disconnecting from the faulted feeder circuit G1, which may be called the make-before-break technique. The ESS 110a may, in conjunction with the power converter 115a track the targeted feeder circuit voltage, which may lead to less inrush current during reconnection. This resynchronization process, however, may result in longer reconnection times, such as an increase from approximately 10 ms to approximately 10 seconds.

Figure 10:
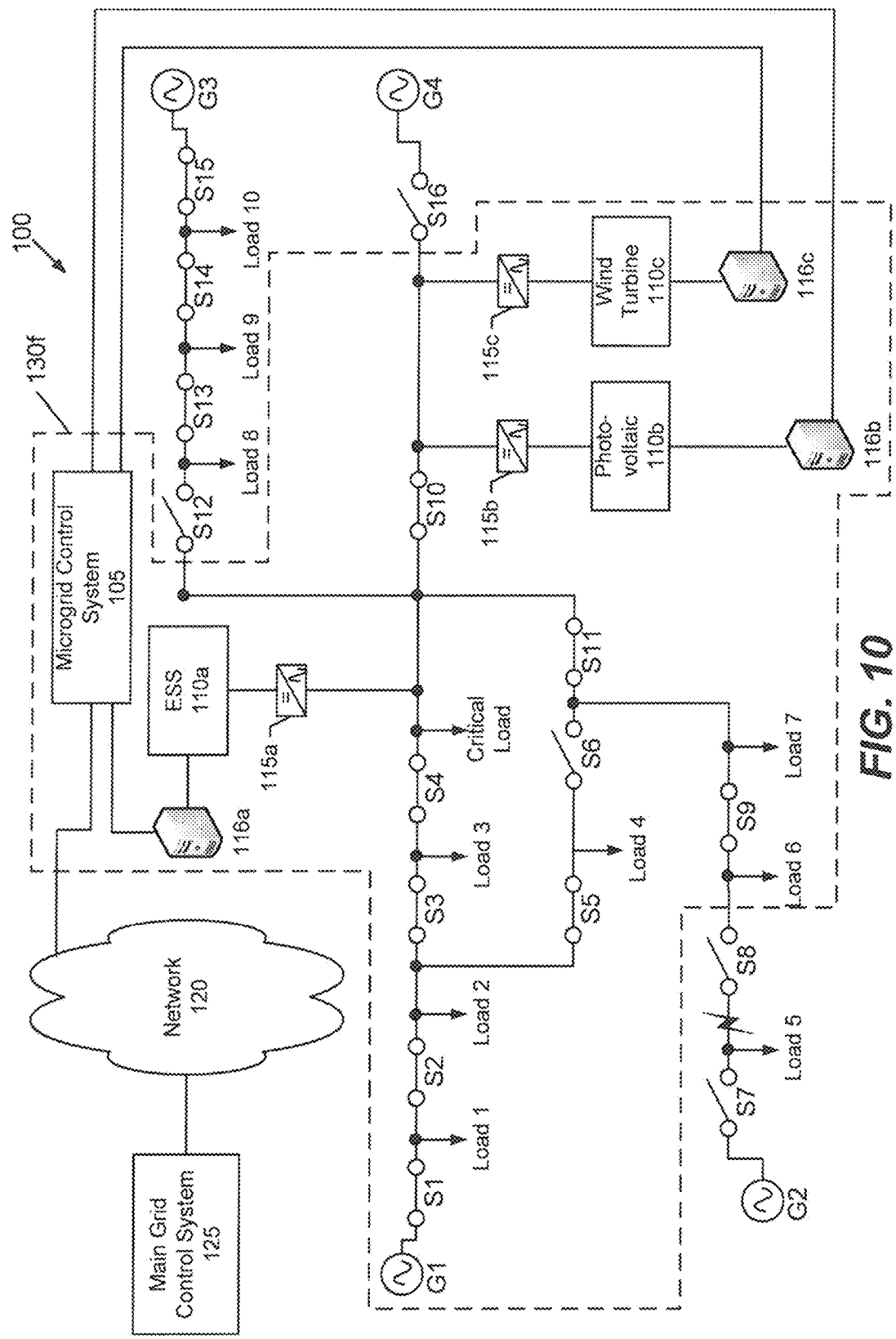

FIG. 10 provides an example of a dynamic microgrid network topology change in response to a fault outside of an existing microgrid. In this example, a fault is detected between Load 5 and smart switch S8 outside of the microgrid 130a of FIG. 5. In response to this event, a microgrid 130f is formed by opening smart switches S7 and S8 to isolate the fault and by closing smart switch S11 to add Load 6 and Load 7 to the microgrid. The microgrid 130a may expand similarly to service various ones of Load 8-Load 10 for faults between smart switch S12 and the feeder circuit G3.

During normal islanded operation, all connections to feeder circuits G1-G4 are severed and the smart switches S1-S15 are configured accordingly to service as many loads as the DERs 110a, 110b, 110c can support.

Figure 11:
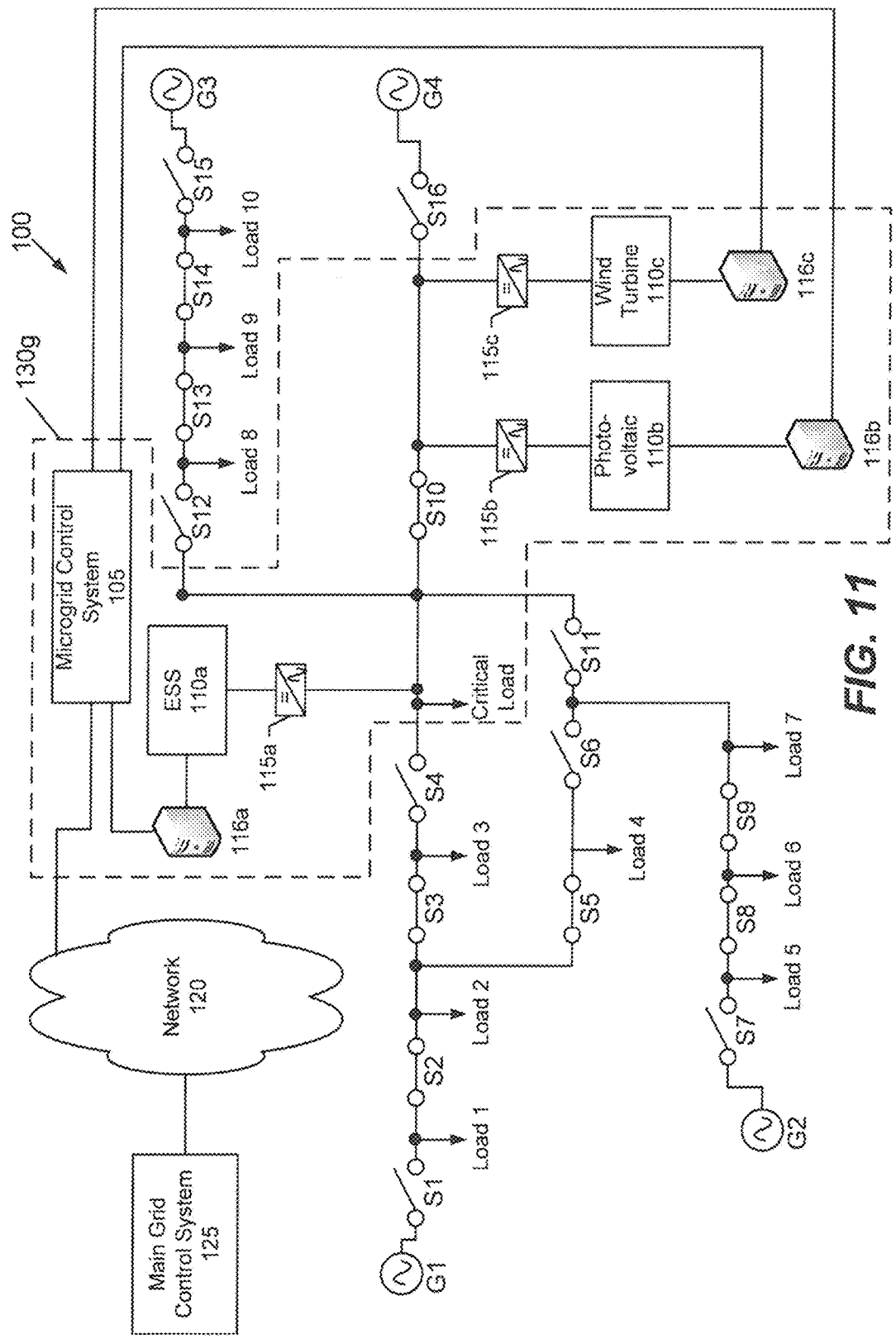
Figure 12:
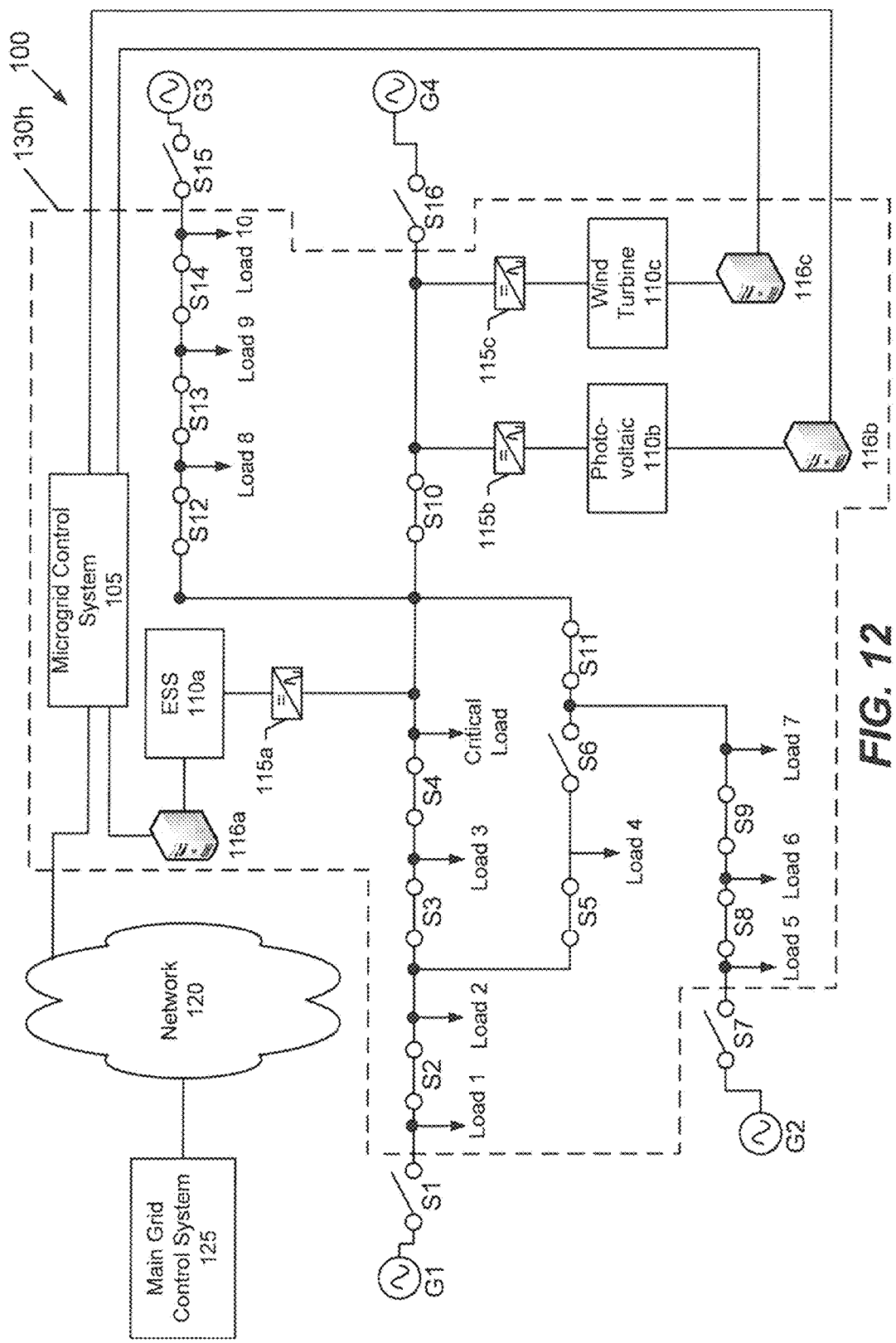

FIGS. 11 and 12 illustrate examples of a minimum and maximum microgrid network topological configuration of the power distribution network 100 according to some embodiments of the inventive subject matter. In the example of FIG. 11, the microgrid 130a of FIG. 5 changes its topological configuration to form microgrid 130g in response to lower power output from DERs 110b and 110c. In this example, the smart switches S4, S11, and S12 are opened so that all loads are shed except for the Critical Load, which may be serviced by the ESS 110a. In the example of FIG. 12, DERs 110b and 110c may be generating power at high output levels, which may provide an incentive to service as many loads as possible via the microgrid. Smart switches S1, S7, S15, and S16 are opened to disconnect from the main power grid, and all other switches are closed with the exception of smart switch S6 to add all loads—Load 1-Load 10—to the microgrid 130h. Depending on the available output power from DERs 110a, 110b, and 110c, more options of microgrid boundary configurations are possible by opening/closing various ones of the smart switches S1-S15 to thereby create different microgrid boundaries.

Although FIGS. 1 and 5-12 illustrate exemplary power distribution networks including a microgrid with dynamically configurable boundaries having multiple main power grid feeder coupling locations, it will be understood that embodiments of the inventive subject matter are not limited to such configurations, but are intended to encompass any configuration capable of carrying out the operations described herein.

Figure 13:
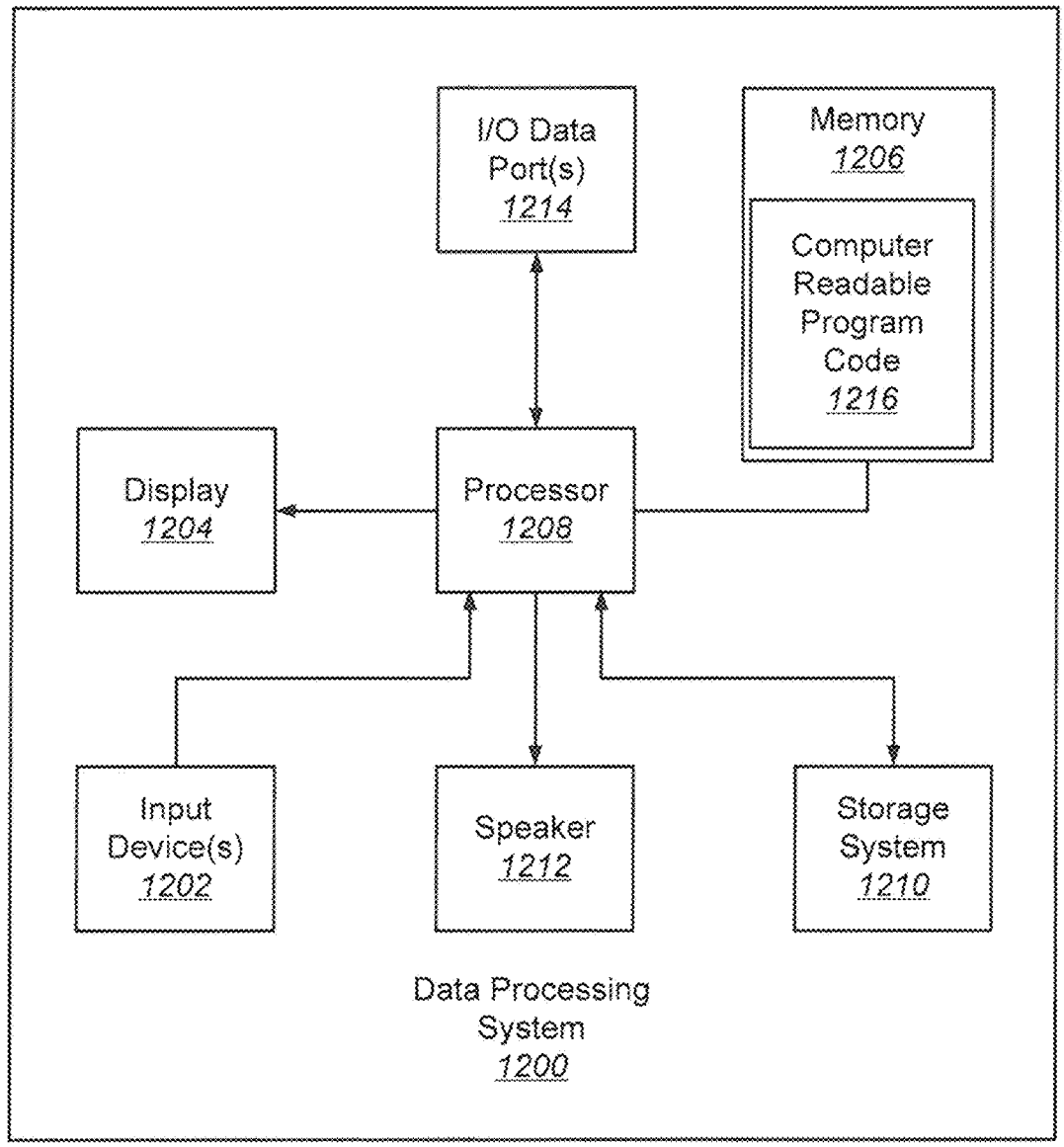
FIG. 13 illustrates a data processing system that may be used to implement various microgrid and main power grid control and/or processing systems of FIGS. 1 and 4-11 in accordance with some embodiments of the inventive subject matter.

Referring now to FIG. 13, a data processing system 1200 that may be used to implement each of microgrid control system 105, main grid control system 125, DER control systems 116a, 116b, and 116c, and power converters 115a, 115b, and 115c, in accordance with some embodiments of the inventive subject matter, comprises input device(s) 1202, such as a keyboard or keypad, a display 1204, and a memory 1206 that communicate with a processor 1208. The data processing system 1200 may further include a storage system 1210, a speaker 1212, and an input/output (I/O) data port(s) 1214 that also communicate with the processor 1208. The processor 1208 may be, for example, a commercially available or custom microprocessor. The storage system 1210 may include removable and/or fixed media, such as floppy disks, ZIP drives, hard disks, or the like, as well as virtual storage, such as a RAMDISK. The I/O data port(s) 214 may be used to transfer information between the data processing system 1200 and another computer system or a network (e.g., the Internet). These components may be conventional components, such as those used in many conventional computing devices, and their functionality, with respect to conventional operations, is generally known to those skilled in the art. The memory 1206 may be configured with computer readable program code 1216 to facilitate operation of a microgrid in a power distribution network in accordance with some embodiments of the inventive subject matter.

Figure 14:
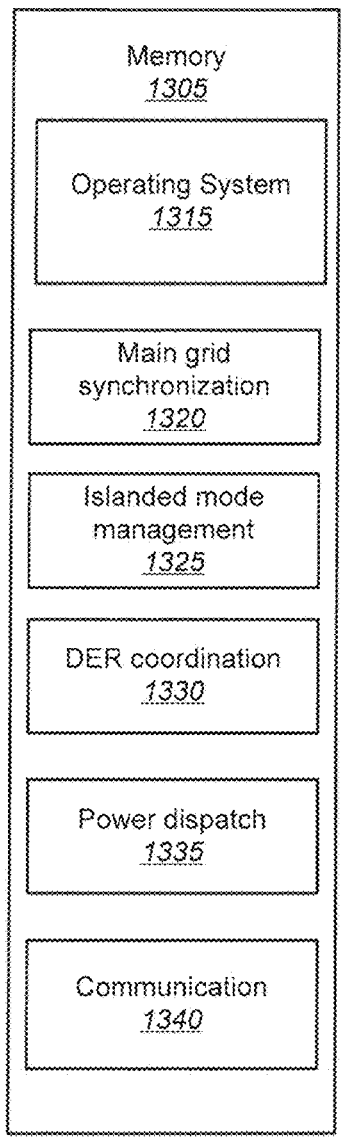
FIG. 14 is a block diagram that illustrates a software/hardware architecture for use in a microgrid control system in accordance with some embodiments of the inventive subject matter.

FIG. 14 illustrates a memory 1305 that may be used in embodiments of data processing systems, such as the microgrid control system 105 of FIGS. 1 and 5-12 and the data processing system of FIG. 13, respectively, to facilitate operation of a microgrid in a power distribution network in accordance with some embodiments of the inventive subject matter. The memory 1305 is representative of the one or more memory devices containing the software and data used for facilitating operations of the microgrid control system 105 as described herein. The memory 1305 may include, but is not limited to, the following types of devices: cache, ROM, PROM, EPROM, EEPROM, flash, SRAM, and DRAM.

As shown in FIG. 14, the memory 1305 may contain six or more categories of software and/or data: an operating system 1315, a main grid synchronization module 1320, an islanded mode management module 1325, a DER coordination module 1330, a power dispatch module 1335, and a communication module 1340. In particular, the operating system 1315 may manage the data processing system's software and/or hardware resources and may coordinate execution of programs by the processor. The main grid synchronization module 1320 may be configured to facilitate synchronization between the microgrid and the main power grid. The islanded mode management module 1325 may be configured to restore frequency and voltage when the microgrid operates in islanded mode. The DER coordination module 1330 and power dispatch module 1335 may be configured to manage power generation among the DERs 110a, 110b, and 110c based on, for example, market prices for electricity/power, DER power generation capability, load conditions, and the like. The communication module 1340 may be configured to facilitate communication with the main grid control system 125 along with communication within the microgrid to the DER control systems 116a, 116b, and 116c and power converters 115a, 115b, and 115c.

Figure 15:
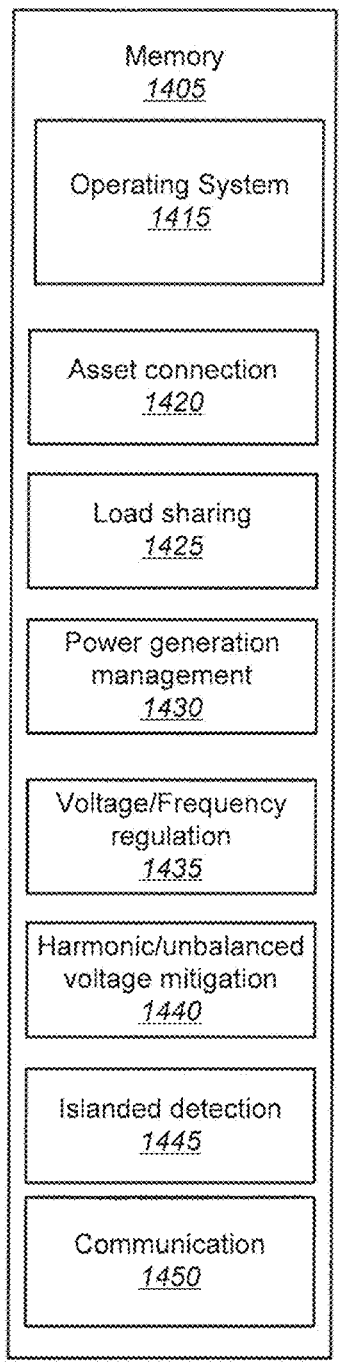
FIG. 15 is a block diagram that illustrates a software/hardware architecture for use in a distributed energy resource control system in accordance with some embodiments of the inventive subject matter.

FIG. 15 illustrates a memory 1405 that may be used in embodiments of data processing systems, such as the DER control systems 116a, 116b, and 116c and/or power converters 115a, 115b, and 115c and also the data processing system of FIG. 13, respectively, to facilitate operation of a microgrid in a power distribution network in accordance with some embodiments of the inventive subject matter. The memory 1405 is representative of the one or more memory devices containing the software and data used for facilitating operations of the DER control systems 116a, 116b, and 116c and/or power converters 115a, 115b, and 115c as described herein. The memory 1405 may include, but is not limited to, the following types of devices: cache, ROM, PROM, EPROM, EEPROM, flash, SRAM, and DRAM.

As shown in FIG. 15, the memory 1405 may contain eight or more categories of software and/or data: an operating system 1415, an asset connection module 1420, a load sharing module 1425, a power generation management module 1430, a voltage/frequency regulation module 1435, a harmonic/unbalanced voltage mitigation module 1440, an islanded detection module 1445, and a communication module 1450. In particular, the operating system 1415 may manage the data processing system's software and/or hardware resources and may coordinate execution of programs by the processor. The asset connection module 1420 may be configured to manage the various functions of assets, such as the loads and DERs 110a, 110b, 110c in the power distribution network. The load sharing module 1425 may be configured to manage load sharing among the DERs 110a, 110b, 110c in the power distribution network. The power generation management module 1430 may be configured to balance power generation in the microgrid during islanded mode. The voltage/frequency regulation module 1435 may be configured to manage voltage and frequency regulation of a microgrid during islanded mode. The harmonic/unbalanced voltage mitigation module 1440 may be configured to manage harmonics and unbalanced voltage mitigation at the PCC with the feeder circuits of the main power grid. The islanded detection module 1445 may be configured to detect when the microgrid has gone into islanded mode, i.e., all connections to the main power grid have been lost. The communication module 1450 may facilitate communication between the DER control systems 116a, 116b, and 116c and/or power converters 115a, 115b, and 115c and with the microgrid control system 105 over the network 120.

Figure 16:
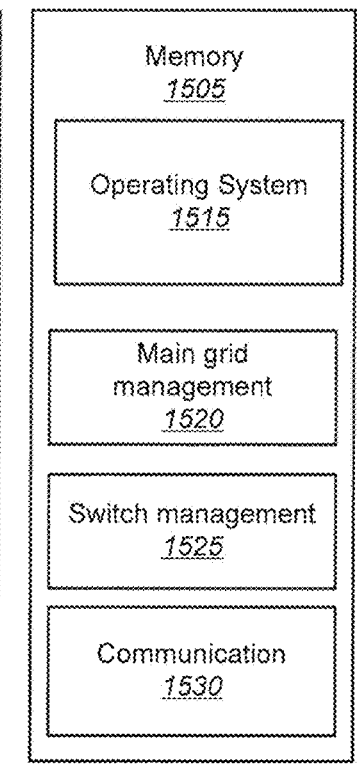
FIG. 16 is a block diagram that illustrates a software/hardware architecture for use in a main power grid management control system in accordance with some embodiments of the inventive subject matter.

FIG. 16 illustrates a memory 1505 that may be used in embodiments of data processing systems, such as the main grid control system 125 and the data processing system of FIG. 13, respectively, to facilitate operation of a microgrid in a power distribution network in accordance with some embodiments of the inventive subject matter. The memory 1505 is representative of the one or more memory devices containing the software and data used for facilitating operations of the main grid control system 125 as described herein. The memory 1505 may include, but is not limited to, the following types of devices: cache, ROM, PROM, EPROM, EEPROM, flash, SRAM, and DRAM.

As shown in FIG. 16, the memory 1505 may contain four or more categories of software and/or data: an operating system 1515, a main grid management module 1520, a switch management module 1525, and a communication module 1530. In particular, the operating system 1515 may manage the data processing system's software and/or hardware resources and may coordinate execution of programs by the processor. The main grid management module 1520 may be configured to monitor and control the generation and distribution of power via the main power grid. The switch management module 1525 may cooperate with the microgrid control system 105 to manage the OPEN/CLOSED states of the smart switches in the power distribution network. The communication module 1530 may be configured to facilitate communication with the microgrid control system 105 over the network 120.

Although FIGS. 13-16 illustrate hardware/software architectures that may be used in data processing systems, such as the microgrid control system 105, main grid control system 125, DER control systems 116a, 116b, and 116c, and power converters 115a, 115b, and 115c for operating a power distribution network including a microgrid with dynamically configurable boundaries having multiple main power grid feeder coupling locations in accordance with some embodiments of the inventive subject matter, it will be understood that the present invention is not limited to such a configuration but is intended to encompass any configuration capable of carrying out operations described herein.

Computer program code for carrying out operations of data processing systems discussed above with respect to FIGS. 1-16 may be written in a high-level programming language, such as Python, Java, C, and/or C++, for development convenience. In addition, computer program code for carrying out operations of the present invention may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller.

Moreover, the functionality of the microgrid control system 105, main grid control system 125, DER control systems 116a, 116b, and 116c, power converters 115a, 115b, and 115c, and the data processing system 1200 of FIG. 13 may each be implemented as a single processor system, a multi-processor system, a multi-core processor system, or even a network of stand-alone computer systems, in accordance with various embodiments of the inventive subject matter. Each of these processor/computer systems may be referred to as a "processor" or "data processing system."

The data processing apparatus described herein with respect to FIGS. 1-16 may be used to facilitate the operation of a power distribution network including a microgrid with dynamically configurable boundaries having multiple main power grid feeder coupling locations according to various embodiments described herein. These apparatus may be embodied as one or more enterprise, application, personal, pervasive and/or embedded computer systems and/or apparatus that are operable to receive, transmit, process and store data using any suitable combination of software, firmware and/or hardware and that may be standalone or interconnected by any public and/or private, real and/or virtual, wired and/or wireless network including all or a portion of the global communication network known as the Internet, and may include various types of tangible, non-transitory computer readable media. In particular, the memories 1305, 1405, and 1505 of FIGS. 14-16, respectively, when coupled to a processor include computer readable program code that, when executed by the respective processors, causes the respective processors to perform operations including one or more of the operations described herein with respect to FIGS. 1-12.

Embodiments of the inventive subject matter may provide a power distribution network including a microgrid that can dynamically reconfigure its network topology to add or shed loads and to disconnect and connect to different main power grid feeder circuits through different coupling interface locations. Short islanded operation times may allow power interruption times to be reduced. Moreover, the flexibility to add loads to expand the microgrid network topological footprint may reduce the need to curtail excess power generated by DERs. By providing a microgrid with access to multiple main power grid feeder circuits at independent coupling interface locations, the capacity requirements of an ESS may be reduced as the main power grid regulates the AC voltage and frequency and balances active and reactive power except for outages affecting an entire substation. The ESS is primarily responsible for peak shaving, reactive power support, and voltage regulation during transitions of the microgrid from grid connected mode, to islanded mode, and the back to grid connected mode. By selectively opening and closing smart switches, microgrids, according to some embodiments of the inventive subject matter, may improve utilization of DER energy sources, improve power exchange between DER sources and the main power grid, and isolate faults both external and internal to the microgrid.

Further Definitions and Embodiments

In the above-description of various embodiments of the present disclosure, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, LabVIEW, dynamic programming languages, such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

It will be understood that, although the terms "first," "second," etc. may be used herein to describe various elements, these elements should not be limited by these terms. These terms are only used to distinguish one element from another. Thus, a first element could be termed a second element without departing from the teachings of the inventive subject matter.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described to best explain the principles of the disclosure and the practical application, and to enable others of ordinary skill in the art to understand the disclosure with various modifications as are suited to the particular use contemplated.

What is claimed is:

1. An energy system, comprising:
a microgrid comprising a network of at least one distributed energy resource and a plurality of loads, the at least one distributed energy resource being configured to supply power to the plurality of loads, the microgrid being configurable to connect to one of a plurality of feeder circuits of a main power grid at one of a plurality of coupling interface locations, respectively;
wherein the microgrid, responsive to an event, is further configured to disconnect from a first one of the plurality of feeder circuits at a first one of the plurality of coupling interface locations of the main power grid, to determine a power distribution between power supplied by the at least one distributed energy resource and power supplied via a second one of the plurality of feeder circuits of the main power grid, and to connect to a second one of the plurality of feeder circuits at a second one of the plurality of coupling interface locations.

2. The energy system of claim 1, wherein the plurality of coupling interface locations comprises a plurality of alternating current bus circuits, respectively.

3. The energy system of claim 1, wherein the microgrid is configured to change a topology of the network in response to an event.

4. The energy system of claim 3, wherein the microgrid is further configured to increase a number of the plurality of loads in the network in response to the event.

5. The energy system of claim 3, wherein the microgrid is further configured to decrease a number of the plurality of loads in the network in response to the event.

6. The energy system of claim 3, wherein the microgrid is further configured to disconnect from all of the plurality of feeder circuits of the main power grid in response to the event.

7. The energy system of claim 3, wherein the event is a fault within the network; and
wherein the microgrid is further configured to select the second one of the plurality of feeder circuits of the main power grid based on economic value, environmental impact, or reliability.

8. The energy system of claim 3, wherein the event is a fault outside of the network; and
wherein the microgrid is further configured to change a number of the plurality of loads in the network in response to the event.

9. The energy system of claim 3, wherein the event comprises a power service interruption or a variation in power generated by the at least one distributed energy resource.

10. The energy system of claim 1, wherein the at least one distributed energy resource comprises an energy storage system, a photovoltaic power generation system, a wind turbine power generation system and/or a renewable resource power generation system.

11. A method, comprising:
providing a microgrid comprising a network of at least one distributed energy resource and a plurality of loads;
supplying power to the plurality of loads using the at least one distributed energy resource; and
connecting the microgrid to one of a plurality of feeder circuits of a main power grid at one of a plurality of coupling interface locations, respectively, responsive to an event;
wherein the event comprises a determination of a cost of power provided by the main power grid the plurality of feeder circuits and a determination of a cost of power provided by the at least one distributed energy resource.

12. The method of claim 11, further comprising:
changing a topology of the network in response to the event.

13. The method of claim 12, further comprising:
changing a number of the plurality of loads in the network in response to the event.

14. The method of claim 12, further comprising:
disconnecting from a first one of the plurality of feeder circuits at a first one of the plurality of coupling interface locations; and
connecting to a second one of the plurality of feeder circuits at a second one of the plurality of coupling interface locations in response to the event.

15. The method of claim 12, further comprising:
disconnecting from all of the plurality of feeder circuits of the main power grid in response to the event.

16. The method of claim 12, wherein the event comprises a power service interruption or a variation in power generated by the at least one distributed energy resource.

17. A method, comprising:
providing a microgrid comprising a network of at least one distributed energy resource and a plurality of loads;
supplying power to the plurality of loads using the at least one distributed energy resource;
performing, responsive to an event, operations comprising:
disconnecting the microgrid from a first one of a plurality of feeder circuits at a first one of a plurality of coupling interface locations of a main power grid;
determining a power distribution between power supplied by the at least one distributed energy resource and power supplied via a second one of the plurality of feeder circuits of the main power grid; and
connecting to a second one of the plurality of feeder circuits at a second one of the plurality of coupling interface locations.

18. The method of claim 17, further comprising:
changing a topology of the network in response to the event.

19. The method of claim 17, further comprising:
changing a number of the plurality of loads in the network in response to the event.

20. The method of claim 17, further comprising:
dynamically changing the power supply area of the microgrid responsive to the event;
wherein the event comprises a variation in power generated by the at least one distributed energy resource.

21. An energy system, comprising:
a microgrid comprising a network of at least one distributed energy resource and a plurality of loads, the at least one distributed energy resource being configured to supply power to the plurality of loads, the microgrid being configurable to connect to one of a plurality of feeder circuits of a main power grid at one of a plurality of coupling interface locations, respectively, in response to an event;
wherein the event comprises a determination of a cost of power provided by the main power grid through the plurality of feeder circuits and a determination of a cost of power provided by the at least one distributed energy resource.

22. The energy system of claim 21, wherein the plurality of coupling interface locations comprises a plurality of alternating current bus circuits, respectively.

23. The energy system of claim 21, wherein the microgrid is configured to change a topology of the network in response to the event.

24. The energy system of claim 21, wherein the microgrid is further configured to disconnect from all of the plurality of feeder circuits of the main power grid in response to the event.

25. The energy system of claim 21, wherein the event is a fault within the network, the microgrid is further configured to disconnect from a first one of the plurality of feeder circuits at a first one of the plurality of coupling interface locations of the main power grid, and to connect to a second one of the plurality of feeder circuits at a second one of the plurality of coupling interface locations in response to the event; and
wherein the microgrid is further configured to select the second one of the plurality of feeder circuits of the main power grid based on economic value, environmental impact, or reliability.

26. The energy system of claim 21, wherein the event further comprises a fault outside of the network; and
wherein the microgrid is further configured to change a number of the plurality of loads in the network in response to the event.

* * * * *